United States Patent
Porter et al.

(10) Patent No.: US 11,624,014 B2
(45) Date of Patent: Apr. 11, 2023

(54) MOISTURE-CURABLE ADHESIVE COMPOSITION AND A METHOD FOR MOUNTING TILES ON WALL SURFACES

(71) Applicant: BOSTIK, INC., Wauwatosa, WI (US)

(72) Inventors: Todd V. Porter, Menomonee Falls, WI (US); Chad P. Bulen, Sussex, WI (US); Serhan Oztemiz, Franklin, WI (US); Liam P. Devlin, Milwaukee, WI (US)

(73) Assignee: Bistik, Inc., Wauwatosa, WI (US)

( * ) Notice: Subject to any disclaimer, the term of this patent is extended or adjusted under 35 U.S.C. 154(b) by 796 days.

(21) Appl. No.: 16/483,196

(22) PCT Filed: Feb. 5, 2018

(86) PCT No.: PCT/US2018/016862
§ 371 (c)(1),
(2) Date: Aug. 2, 2019

(87) PCT Pub. No.: WO2018/145002
PCT Pub. Date: Aug. 9, 2018

(65) Prior Publication Data
US 2020/0010746 A1    Jan. 9, 2020

Related U.S. Application Data

(60) Provisional application No. 62/470,524, filed on Mar. 13, 2017, provisional application No. 62/455,142, filed on Feb. 6, 2017.

(51) Int. Cl.
| | |
|---|---|
| C08K 3/26 | (2006.01) |
| C08K 9/06 | (2006.01) |
| C08K 7/08 | (2006.01) |
| C09J 171/02 | (2006.01) |
| C08K 7/10 | (2006.01) |
| C08K 9/02 | (2006.01) |
| C08L 21/00 | (2006.01) |
| C09J 175/04 | (2006.01) |
| E04F 21/02 | (2006.01) |
| C08G 65/336 | (2006.01) |
| C08K 5/00 | (2006.01) |

(52) U.S. Cl.
CPC .............. *C09J 171/02* (2013.01); *C08K 3/26* (2013.01); *C08K 7/08* (2013.01); *C08K 7/10* (2013.01); *C08K 9/02* (2013.01); *C08K 9/06* (2013.01); *C08L 21/00* (2013.01); *C09J 175/04* (2013.01); *E04F 21/023* (2013.01); *C08G 65/336* (2013.01); *C08K 5/0016* (2013.01); *C08K 2201/004* (2013.01)

(58) Field of Classification Search
CPC ...... C09J 171/00; C09J 171/02; C09J 175/04; C08G 18/837; C08G 65/336; C08K 3/26; C08K 7/08; C08K 9/02; C08K 9/06; C08K 2003/265
See application file for complete search history.

(56) References Cited

U.S. PATENT DOCUMENTS

| | | |
|---|---|---|
| 3,766,135 A | 10/1973 | Yamanouchi et al. |
| 3,971,751 A | 7/1976 | Isayama et al. |
| 6,046,270 A | 4/2000 | Roesler et al. |
| 6,271,299 B1 | 8/2001 | Alvarez et al. |
| 2006/0243832 A1 | 11/2006 | McMinn |
| 2011/0071254 A1 | 3/2011 | Bachon et al. |
| 2011/0154772 A1* | 6/2011 | Lontchar ................ C09J 175/08 428/323 |
| 2013/0065997 A1* | 3/2013 | Gahlmann ........... C08G 65/336 524/262 |
| 2015/0065613 A1 | 3/2015 | Balijepalli et al. |

FOREIGN PATENT DOCUMENTS

| | | |
|---|---|---|
| DE | 102010002808 A1 | 9/2011 |
| EP | 2055753 A1 | 5/2009 |
| EP | 2535376 A1 | 12/2012 |

OTHER PUBLICATIONS

Yuan et al; "influence of surface treatment of hybrid wollastonite . . . "; J. Mater. Sci., vol. 43; pp. 6057-6063. (Year: 2008).*
Petrie, EM., MS Polymers in "Hybrid" Sealants, EMP Solutions, [online] May 2010 The Adhesive and Sealant Council, Inc. [Retrieved from Internet: <URL: http://www.adhesives.org/docs/default-document-library/hybrid_sealants_may2010-final-(1).pdf>], pp. 1-8.
Wollastonite NYAD MG Technical Data Sheet, NYCO Brand of the S&B Group, www.nycominerals.com; Downloaded in Jan. 2017, 2 pages.

* cited by examiner

*Primary Examiner* — Karuna P Reddy
(74) *Attorney, Agent, or Firm* — Christopher R. Lewis

(57) ABSTRACT

A moisture-curable adhesive composition comprises a polymer component selected from a silane-terminated polyalkylene oxide and/or a polyurethane; a plurality of aminosilane modified wollastonite fibers having an average aspect ratio of from about 1.5:1 to about 12:1 and an average fiber length of from about 6 µm to about 825 µm; at least two fillers, wherein one of said fillers is untreated and a second of said fillers is treated with a modifier selected from the group consisting of a fatty acid derivative, a silane, a titanate, and mixtures thereof wherein at least one of said fillers is irregularly shaped; and a rheology modifier. The composition preferably further comprises a plurality of irregularly-shaped crumb rubber particles having an average particle size of between about 0.5 to 1.5 mm. The composition is useful for adhering tiles to surfaces, especially large format tiles to substantially vertically-extending wall surfaces.

17 Claims, 7 Drawing Sheets

MOISTURE-CURABLE ADHESIVE COMPOSITION AND A METHOD FOR MOUNTING TILES ON WALL SURFACES

CROSS-REFERENCE TO RELATED APPLICATIONS

This application is a U.S. national stage application under 35 U.S.C. § 371 of PCT/US2018/016862 filed Feb. 5, 2018, which claims the benefit under 35 U.S.C. § 119 of U.S. patent application Nos. 62/455,142, filed Feb. 6, 2017, and 62/470,524, filed Mar. 13, 2017.

FIELD OF THE INVENTION

This invention relates to adhesive compositions and methods for adhering together adherends, especially for mounting tiles on wall surfaces. More particularly, the adhesive composition is suitable for mounting large format tiles including gauged porcelain panels on wall surfaces.

BACKGROUND OF THE INVENTION

A number of properties must be balanced when developing an adhesive formulation used to mount tiles to surfaces, such as flooring, sub-flooring, or wall surfaces. For example, the adhesive composition must have a long enough open time so that it can be applied to the back surface of the tile and/or the mounting surface, as needed, and yet must cure relatively quickly after the tile is put in place while still allowing for some small level of adjustment by repositioning after mounting the tile on the surface. The uncured adhesive also should have desirable rheological properties such that it can be mixed and applied easily yet resists the shear imposed by gravity. Such considerations are especially challenging when the adhesive composition is used to mount tiles to wall surfaces and even more so when those tiles are large or have a high area density (i.e., weight of the tile per surface area of the tile). In such instances, the adhesive must demonstrate good sag resistance (also known as green grab). In addition, it is desirable that the formulation minimizes the formation of "legs" or strings of material that come off the trowel after application and potentially drip down the wall surface. Finally, the adhesive formulation preferably minimizes or eliminates the formation of void spaces between the tile and the mounting surface.

A recent trend in tile manufacturing and installation is the use of large format tiles. As used herein, a large format tile means any tile having a surface area of at least one square meter. For example, the dimensions of a large format tile may be 1×1 meters, 1×3 meters, 1.5×4.5 meters, and other dimensions. One type of large format tiles is gauged porcelain tiles, which are thin (e.g., about 3-6.5 mm thick) porcelain tiles that are at least one square meter. In view of the surface area and relative thinness of these tiles, breakage of the tiles upon installation is a concern. Furthermore, the current guidelines of the Tile Council of North America (TCNA) specify a lippage, which is the variation in height of adjoining tiles, for gauged porcelain tiles of no more than one-sixteenth of an inch. Mounting of large format tiles in general, and specifically of gauged porcelain tiles, has proven difficult with breakage being a significant problem, resulting in financial loss and delays. An impact to the side or edge of such tiles may cause it to chip or break.

The current method of mounting large format tiles on walls or vertical surfaces with a traditional ceramic tile adhesive, as recommended by installation guides by the tile manufacturer, uses inorganic binders that are largely mortar based and have a number of downsides to the process, as follows:

1. The current process is a messy process of mixing, applying, and disposing of the mortar. The mixing of the mortar with water creates a large amount of dust at the jobsite, which raises both health and safety issues and leads to extra man hours to clean the area.
2. The mixing itself also requires the use of power tools, which necessitates the proximity to working near electrical outlets or portable power generators.
3. If any material is forced out into the grout lines, the cured material is very difficult to remove without damaging the tile.
4. The current binder, once mixed, has a short pot life that cannot be retarded once mixed. This leads to excessive waste as the installer must accurately measure the amount needed as it is not possible to save mixed material which is not used during the pot life.
5. The current method also requires a significant amount of labor during application due to the need to "back butter" the tiles. This step requires the installer to place adhesive/mortar on the mounting surface (or substrate, such as a wall surface) as well as the back surface of the tile before application. The tile is then placed on the substrate that has been coated in adhesive/mortar. Once applied, it is common practice to use a vibratory power tool to remove all the air pockets behind the tile to ensure adequate coverage/support and minimize voids.
6. The current method cannot form chemical bonds with the current tile. The backing is largely an epoxy/fiberglass composite that will not chemically bond with the current mortars. This leads to a possible adhesion issue over time.
7. The current method also requires a very flat surface to ensure that the tile/mortar make contact with the mounting surface. If there is a deviation in the planarity/flatness of the substrate, the mortar will not hold the tile in place and this will create a void. This void is very prone to fracture after installation if any form of mechanical impact occurs near this imperfection. The current process also utilizes a high mass of material once applied. The current method is also very cumbersome to reposition the tile once it is set due to the "back buttering" step mentioned above. This presents a challenge for building material selection due to the inherent load that must be factored in the building design, which can compromise the substrate and lead to failure.
8. The current method also creates a very rigid bed to which the tile is adhered. This bed develops a large amount of stress during curing. Any movement of the substrate can cause failures in the tile.

European Patent No. 2 055 753 discloses a moisture-curable adhesive for joining wood elements together. The adhesive comprises a silane-modified polymer, one or more coupling agents, and additional optional additives, including treated or untreated fillers. The treatment may be accomplished by an amino-silane. This patent does not contemplate the use of the adhesive for mounting tiles, such as ceramic tiles, onto any surfaces, let alone wall surfaces.

U.S. Patent Application Publication No. 2013/0065997 discloses an adhesive composition for mounting wooden floor coverings to sub-floors comprising: (a) 10 to 30 percent by mass of a moisture-reactive, silane-terminated polyalkylene oxide binding agent with an average molecular weight of 6,000 to 20,000 g/mol, the silane functions being bonded via urethane- and/or urea groups to the oligomeric skeletal structure; (b) 30 to 60 percent by mass of a surface-hydrophobized chalk powder with an average particle diameter of 0.8 to 4.0 μm; (c) 2 to 10 percent by mass of a surface-hydrophobized chalk powder with an average particle diameter of 0.2 to 0.7 μm; (d) 3 to 15 percent by mass of a surface-hydrophobized wollastonite with an average needle length of 15 to 60 μm and an average aspect ratio of 3:1 to 12:1; (e) 0.2 to 3 percent by mass of a moisture-reactive, silane-modified drying agent; and (f) 0.3 to 4 percent by mass of a moisture-reactive, silane-modified adhesion promoter. This publication does not contemplate the use of the adhesive for mounting tiles, such as ceramic tiles, onto any surfaces, let alone wall surfaces.

SUMMARY OF THE INVENTION

The shortcomings in the prior art mentioned above are at least partially overcome by embodiments of the present invention. In accordance with an embodiment of the present invention, a moisture-curable adhesive composition comprises a polymer component selected from a silane-terminated polyalkylene oxide and/or a polyurethane, such as a silane-modified polyurethane; a plurality of amino-silane modified wollastonite fibers having an average aspect ratio of from about 1.5:1 to about 12:1 and an average fiber length of from about 6 μm to about 825 μm; at least two fillers, wherein one of said fillers is untreated and a second of said fillers is treated with a modifier selected from the group consisting of a fatty acid derivative, a silane, a titanate, and mixtures thereof and wherein one of said fillers has an average particle size of between about 1.5 μm and 10 μm and a second of said fillers has an average particle size of between about 0.1 μm and about 1.3 μm, wherein at least one of said fillers is irregularly shaped; and a rheology modifier and, optionally, other functional additives.

According to another embodiment of the present invention, a method for mounting a large format tile to a wall comprising the steps of: applying an adhesive composition to a back surface of a large format tile, wherein the tile has a surface area of at least one square meter and the adhesive composition is moisture-curable and comprises: (i) a polymer component selected from a silane-terminated polyalkylene oxide and/or a polyurethane; (ii) a plurality of amino-silane modified wollastonite fibers; (iii) a filler; and (iv) a rheology modifier; and applying the large format tile to a substantially vertically-extending wall surface by contacting the back surface of the tile with the wall surface prior to full curing of the adhesive composition.

According to embodiments of the invention, an alternative method of setting and adhering large format tiles (specifically gauged porcelain panels) to wall surfaces extending substantially vertically is provided.

DETAILED DESCRIPTION OF THE INVENTION

Figure 1:
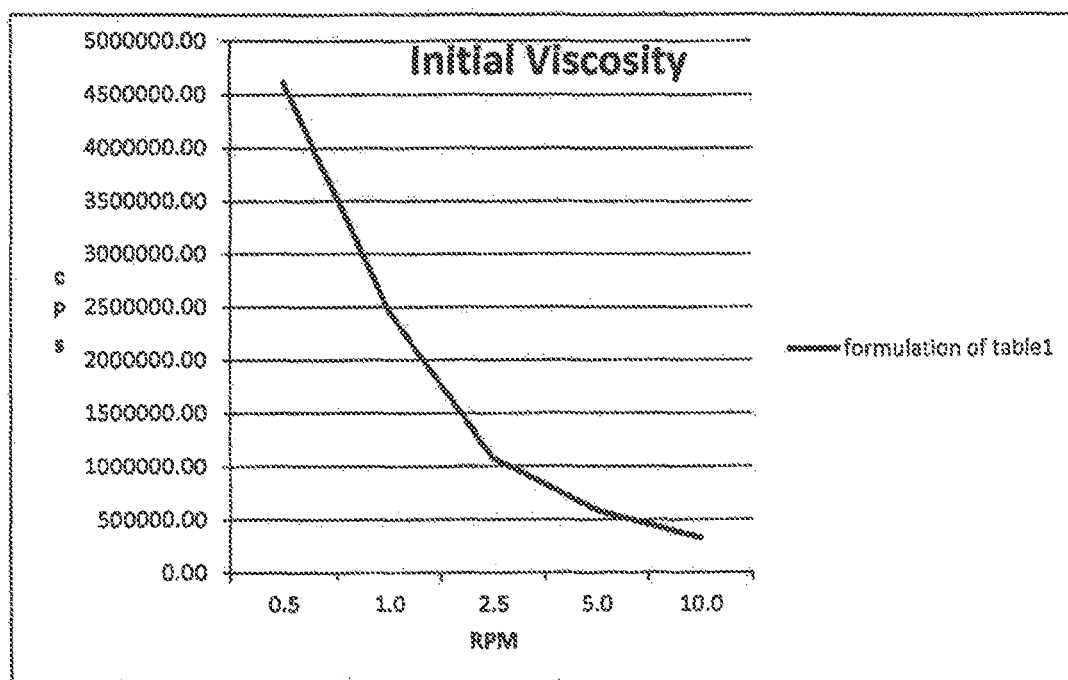
FIG. 1 shows a graph of viscosity of an adhesive composition of the present invention as a function of shear ranging from 0.5 to 10 rpm.

In accordance with the present invention, a moisture-curable adhesive composition comprises: (a) a polymer component selected from a silane-terminated polyalkylene oxide and/or a polyurethane, such as a silane-modified polyurethane; a plurality of amino-silane modified wollastonite fibers having an average aspect ratio of from about 1.5:1 to about 12:1 and an average fiber length of from about 6 μm to about 825 μm (as measured by the use of scanning electron microscopy "SEM" as described fully in the examples herein); at least two fillers, wherein one of said fillers is untreated and a second of said fillers is treated with a modifier selected from the group consisting of a fatty acid derivative, a silane, a titanate, and mixtures thereof and wherein one of said fillers has an average particle size of between about 1.5 μm and about 10 μm and a second of said fillers has an average particle size of between about 0.1 μm and about 1.3 μm, wherein at least one of said fillers is irregularly shaped; and a rheology modifier. The composition may be used to adhere any two adherends together which permit the use of moisture-curable adhesives, but is especially suitable for mounting tiles (especially large format tiles) to substrates, such as wall surfaces or floor or sub-floor surfaces.

The polymer component selected from a silane-terminated polyalkylene oxide and/or a polyurethane is preferably one or more of the silane-terminated polyalkylene oxide, also referred to as silyl-modified polymers or SMP polymers. Such a silane-terminated polyalkylene oxide may be any suitable silane-terminated polyalkylene oxide. The backbone skeleton of the silane-terminated polyalkylene oxide used in the present invention is not particularly limited and organic polymers having various backbone skeletons can be used. The backbone skeleton preferably contains at least one selection from a hydrogen atom, carbon atom, nitrogen atom, oxygen atom, and sulfur atom and provides excellent curability and adhesiveness to the resulting composition. Specific examples of the backbone include polyoxyethylene, polyoxypropylene, polyoxybutylene, polyoxytetramethylene, polyoxyethylene-polyoxypropylene copolymers, and polyoxypropylene-polyoxybutylene copolymers.

As mentioned above, the polymer component may be a polyurethane, such as a silane-modified polyurethane. Silane-modified polurethane polymers, known as SPURs, contain silylated polyurethane polymer chain with the bulk of the polymer containing urethane linkage. The polymer component may also be mixtures of a silane-terminated polyalkylene oxide and a polyurethane.

The silane-terminated moiety of the silane-terminated polyalkylene oxide and the silane-modified moiety of the silane-modified polyurethane comprises a reactive silyl group. The reactive silyl group in the present invention is a group that contains a hydroxy or a hydrolyzable group bonded to a silicon atom and can undergo crosslinking through the formation of a siloxane bond by a reaction which may be accelerated by a silanol condensation catalyst. In embodiments of the invention, the reactive silyl group may be a group represented by formula (1):

$$-SiR^1_{3-a}X_a \qquad (1)$$

wherein each $R^1$ is independently a C1 to C20 alkyl group, a C6 to C20 aryl group, a C7 to C20 aralkyl group, or a triorganosiloxy group represented by —$OSi(R')_3$ where each R' is independently a C1 to C20 hydrocarbon group; each X is independently a hydroxy group or a hydrolyzable group; and a is an integer of 1 to 3.

The hydrolyzable group is not particularly limited, and may be any conventionally known hydrolyzable group. Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferred among these are a hydrogen atom, an alkoxy group, an acyloxy group, a ketoxymate group, an amino group, an amido group, an aminooxy group, a mercapto group, and an alkenyloxy group. Particularly preferred is an alkoxy group.

From 1 to 3 hydrolyzable or hydroxy groups can be bonded to a single silicon atom. When two or more hydrolyzable or hydroxy groups are bonded per reactive silyl group, these groups may be the same as or differ from one another. The value of 'a' in formula (1) is preferably 2 or 3 from the standpoint of curability and in particular is preferably 3 when rapid curability is required, or is preferably 2 when storage stability is required.

Specific examples of $R^1$ in formula (1) include alkyl groups such as a methyl group and an ethyl group; cycloalkyl groups such as a cyclohexyl group; aryl groups such as a phenyl group; aralkyl groups such as a benzyl group; and triorganosiloxy groups represented by —$Oi(R')_3$ with R's each being a group such as a methyl group and a phenyl group. Among these, a methyl group is particularly preferred.

Specific examples of the reactive silyl group include a trimethoxysilyl group, a triethoxysilyl group, a triisopropoxysilyl group, a dimethoxymethylsilyl group, a diethoxymethylsilyl group, and a diisopropoxymethylsilyl group. Preferred are a trimethoxysilyl group, a triethoxysilyl group, and a dimethoxymethylsilyl group as they have high activity to achieve favorable curability. Particularly preferred is a trimethoxysilyl group. Also, a dimethoxymethylsilyl group and a triethoxysilyl group are particularly preferred in terms of storage stability. In addition, a triethoxysilyl group and a diethoxymethylsilyl group are particularly preferred because they provide ethanol as the alcohol generated in connection with the hydrolysis reaction of the reactive silyl group, which means they have higher safety. The reactive silyl group may be introduced by any suitable method, including conventionally known methods.

In a preferred embodiment, the polymer component comprises two silane-terminated polyalkylene oxides. The first silane-terminated polyalkylene oxide comprises a methoxysilyl chain polymer and has a branched polyether backbone and a molecular weight in the range of about 16,000 to about 18,000 g/mol. Such a product is commercially available under the trademark SAX260 and is sold by Kaneka North America, LLC of Pasadena, Tex. The second silane-terminated polyalkylene oxide comprises a methoxysilyl chain polymer and has a linear polyether backbone and a molecular weight in the range of about 26,000 to about 28,000 g/mol. Such a product is commercially available under the trademark 5227 and is also sold by Kaneka North America.

The amount of the polymer component may vary over a wide range to achieve the properties of the particular adhesive application for which the composition is being used. In an embodiment in which the adhesive composition is used to mount tiles (especially large format tiles) to substrates (especially substantially vertically extending wall surfaces), the polymer component is present in an amount which achieves the properties of that application, and preferably is present, as the one or more silane-terminated polyalkylene oxides, in an amount of between about 5 to about 40% by weight, preferably between about 10 to about 30% by weight, more preferably between about 12 to about 24% by weight, and most preferably between about 15 to about 20% by weight. It is believed the polymer selected and the amount used contributes to the rheological and other properties important for this embodiment. Unless otherwise noted, all compositional percentages provided herein are the percentage by weight of the constituent based on the total weight of the adhesive composition before curing, including any inherent moisture in each constituent and in the adhesive composition. Also, wall surfaces herein are sometimes referred to as substantially vertically extending wall surfaces, meaning that they either extend truly vertically or at a slight offset from vertical, such as less than 5°. In the embodiment described above using the two silane-terminated polyalkylene oxides, the first silane-terminated polyalkylene oxide (having the branched polyether backbone) is preferably present in an amount of between about 5 to about 30% by weight and the second silane-terminated polyalkylene oxide (having the linear polyether backbone) is preferably present in an amount of between about 0.5 to about 5% by weight.

As mentioned above, the moisture-curable adhesive composition of the present invention also comprises a plurality of amino-silane modified wollastonite fibers, which are acicular, have an average aspect ratio of from about 1.5:1 to about 12:1, and an average fiber length of from about 6 μm to about 825 μm. Wollastonite is an industrial mineral comprised chemically of calcium, silicon, and oxygen and having a molecular formula is $CaSiO_3$. It may contain small amounts of iron, magnesium, and manganese substituting for calcium. Amino-silane treated wollastonite fibers are acicular and are well-known and commercially available. For example, wollastonite fibers may be treated by mixing wollastonite fibers with an amino-silane mixed in an ethanol-water mixture and then drying. A particularly suitable amino-silane treated wollastonite for use in an adhesive composition used to mount tiles (especially large format tiles) to wall surfaces is sold under the trademark Nyad Wollastocoat MG 20804 by Imerys North America of Roswell, Ga. Although referred to herein as "amino-silane" treated, the final product may be in the form of an amino silicate bonded to wollastonite fibers, as is well-known. Provided below at formula (2) is an exemplary amino-silane which may be used to treat wollastonite fibers:

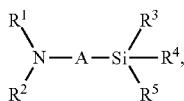

(2)

wherein $R^3$, $R^4$, or $R^5$ can be either methoxy, ethoxy, or methyl groups; $R^1$ and $R^2$ are H; and A is a propyl chain. As can be appreciated, the wollastonite fibers may be purchased in an already treated state or may be purchased as untreated fibers and treated shortly before mixing with the other constituents and forming the adhesive of the present invention.

The amount of the amino-silane modified wollastonite fibers may vary over a wide range to achieve the properties of the particular adhesive application for which the composition is being used. In the embodiment in which the adhesive composition used to mount tiles (especially large format tiles) to substrates (especially wall surfaces), the plurality of amino-silane modified wollastonite fibers is preferably present in an amount of about 3 to about 15% by weight, with the amino-silane loading being about 1 to about 35% by weight of the fibers. More preferably, the plurality of amino-silane modified wollastonite fibers is present in an amount of about 5 to about 10% by weight, with the amino-silane loading being about 2 to about 20% by weight of the fibers. Even more preferably, the plurality of amino-silane modified wollastonite fibers is present in an amount of about 6 to about 8% by weight, with the amino-silane loading being about 4 to about 10% by weight of the fibers. Most preferably, the plurality of amino-silane modified wollastonite fibers is present in an amount of about 7% by weight.

The aspect ratio and an average fiber length of the amino-silane modified wollastonite fibers may vary over the ranges specified above to achieve the properties of the particular adhesive application for which the composition is being used. In the embodiment in which the adhesive composition used to mount tiles (especially large format tiles) to substrates (especially wall surfaces), the aspect ratio and the average fiber length of the amino-silane modified wollastonite fibers preferably range from about 2:1 to about 8:1 and about 10 μm to about 40 μm (as measured by using SEM as described fully in the examples), respectively. Except as otherwise noted specifically, all references herein to average fiber length and aspect ratio are determined using the scanning electron microscopy process as described fully in the examples herein (the "SEM Process"). More preferably, the aspect ratio and the average fiber length of the amino-silane modified wollastonite fibers range from about 2:1 to about 5:1 and about 12 μm to about 25 μm, respectively. Most preferably, the aspect ratio and the average fiber length of the amino-silane modified wollastonite fibers range from about 2.6:1 to about 3:1 and from about 17 μm to about 20 μm, respectively. Without being bound by any theory, it is believed that the amino-silane treatment of the wollastonite affords some type of chemical interaction with the polymer component (potentially via the silyl reactive group), as formulations of the present invention lead to a smoother texture of the uncured adhesive and lead to improved rheological properties. Also, it is believed that the selected fibers, along with the identified aspect ratios and average fiber length, contribute to the rheological and other properties of the adhesive of the present invention.

Figure 2:
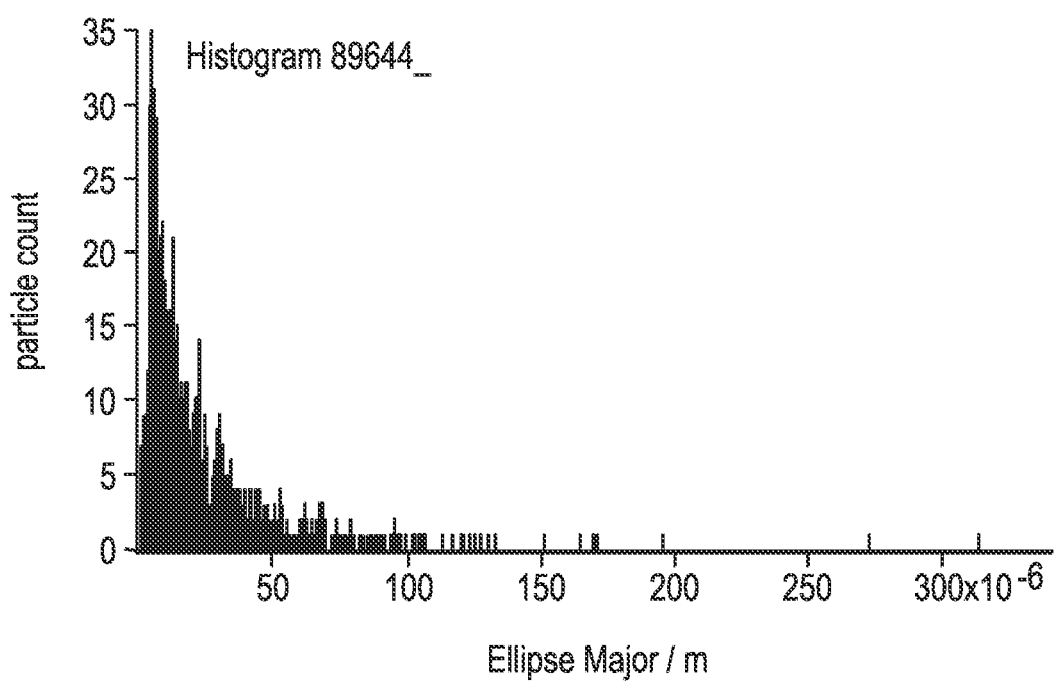
FIG. 2 is a histogram with the x-axis being the length (in microns) of a fiber from a first sample batch (i.e., identified as 89644) of the amino-silane treated wollastonite fibers used in the examples herein. The y-axis is the number of fibers having that length.
Figure 3:
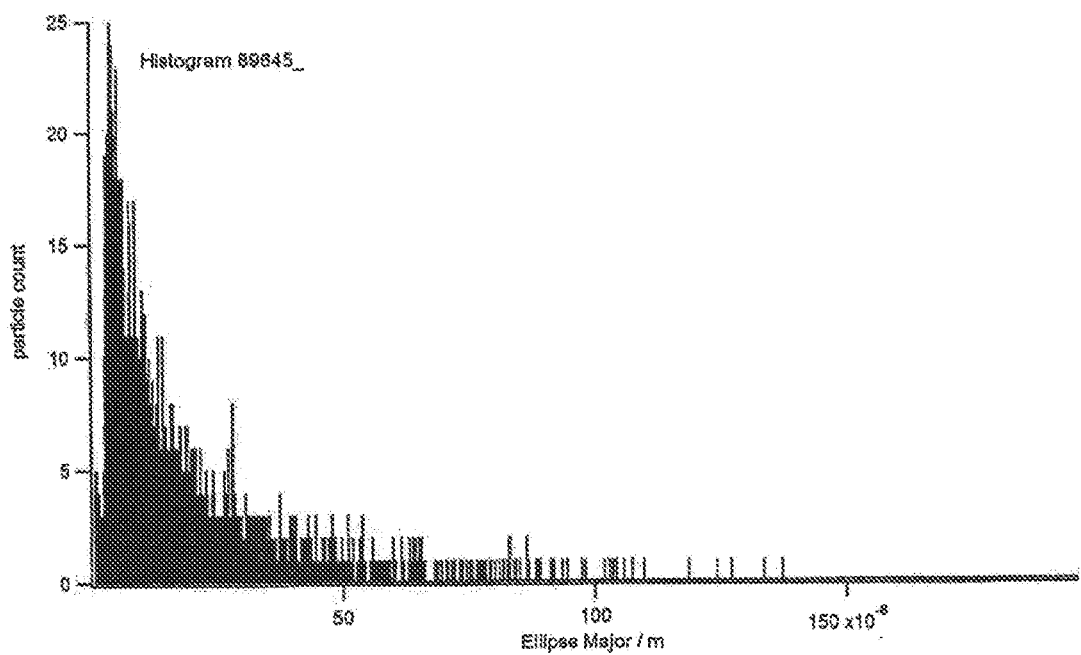
FIG. 3 is a histogram similar to FIG. 2, except that it is from a second sample batch (i.e., identified as 89645) of the amino-silane treated wollastonite fibers used in the examples herein.

FIGS. 2 and 3 are histograms showing particle size distribution information about the fiber length of the amino-silane treated wollastonite fibers used in the examples herein. In each, the x-axis is the length of a fiber from a sample batch (either 89644 or 89645) of the amino-silane treated wollastonite fibers used in the examples herein, as measured by the SEM Process below. The y-axis is the number of fibers having that length. As can be seen, the distribution has a fairly abrupt peak (i.e., at about one-half of the average value) and then a tail of decreasing counts as the fiber length increases above the peak value (i.e., about 20-23 microns for each sample). The frequency of fibers having lengths above 80 microns decreases significantly, very little fibers have lengths above 100 microns, and none have lengths above 150 microns. The D90 is approximately 40 microns.

As mentioned above, the moisture-curable adhesive composition of the present invention also comprises at least two fillers, wherein one of the fillers is untreated and a second of said fillers is treated with a modifier selected from the group consisting of a fatty acid derivative, a silane, a titanate, and mixtures thereof and wherein one of the fillers has an average particle size of between about 1.5 μm and about 20 μm and a second of said fillers has an average particle size of between about 0.1 μm and about 1.3 μm, and wherein at least one of said fillers is irregularly shaped. The filler which is treated may have the larger or smaller average particle size, and the filler which is untreated may also have the larger or smaller average particle size. Either filler may be irregularly-shaped.

Examples of the filler include reinforcing fillers such as fumed silica, precipitated silica, crystalline silica, fused silica, dolomite, silicic anhydride, hydrous silicic acid, and carbon black; fillers such as calcium carbonate (including ground calcium carbonate, precipitated calcium carbonate, heavy calcium carbonate, and colloidal calcium carbonate), magnesium carbonate, diatomite, calcined clay, clay, talc, titanium oxide, bentonite, organobentonite, ferric oxide, fine aluminum powder, flint powder, zinc oxide, activated zinc white, shirasu balloons, glass microballoons, organic microballoons of a phenolic resin or a vinylidene chloride resin, and resin powders such as PVC powder and PMMA powder; and fibrous fillers such as glass fiber and filaments.

The amount of the at least two fillers may vary over a wide range to achieve the properties of the particular adhesive application for which the composition is being used. In the embodiment in which the adhesive composition used to mount tiles (especially large format tiles) to substrates (especially wall surfaces), the at least two fillers are ground calcium carbonate and are preferably present in an amount of about 30 to about 70% by weight. More preferably, the at least two fillers are present in an amount of about 40 to about 60% by weight. Most preferably, the at least two fillers are present in an amount of about 42 to about 50% by weight.

In the embodiment in which the adhesive composition used to mount tiles (especially large format tiles) to substrates (especially wall surfaces), the treated filler has an average particle size of about 0.7 μm and the untreated filler has an average particle size of about 3 μm. As to the treated filler, the modifier is preferably the fatty acid derivative, and most preferably stearic acid. The manner in which a filler is treated with a modifier is well-known. In a preferred embodiment, the at least two fillers comprise a first, second, and third filler. The first filler comprises stearate-treated ground calcium carbonate particles having a mean particle size between about 1.5 μm and about 10 μm, preferably between about 1.5 μm and about 6 μm, and most preferably between about 2 μm and about 5 μm. The first filler is preferably present in the composition in an amount of about 1 to about 27% by weight, preferably between about 7 to about 19% by weight, and most preferably about 13% by weight. Such a product is commercially available under the trademark KOTAMITE and is sold by Imerys. The second filler comprises untreated ground calcium carbonate particles having a mean particle size between about 1.5 μm and about 10 μm, preferably between about 1.5 μm and about 6 μm, and most preferably between about 2 μm and about 5 μm. The second filler is preferably present in the composition in an amount of about 1 to about 34% by weight, preferably between about 14 to about 28% by weight, and most preferably about 23% by weight. Such a product is commercially available under the trademark ATOMITE and is sold by Imerys. The third filler comprises stearate-treated ground calcium carbonate particles having a mean particle size between about 0.1 μm and about 1.3 μm, preferably between about 0.2 μm and about 1.2 μm, and most preferably between about 0.4 μm and about 1 μm. The third filler is present in the composition in an amount of about 1 to about 20% by weight, preferably between about 5 to about 15% by weight, and most preferably about 10% by weight. Such a product is commercially available under the trademark CAMEL-CAL ST and is sold by Imerys.

As mentioned above, at least one of the fillers is irregularly-shaped. As used herein, "irregularly shaped" refers to fillers (or other particles) which are not spheroidal or substantially spheroidal. Examples include conical-, polygonal- (cubes, pentagons, hexagons, octagons, and the like), and polyhedral-shaped particles, as well as irregular shaped particles, as well as non-uniform particles having, for example circular, elliptical, oval, square, rectangular, triangular or polygonal cross sections found at least partially therein. "Irregularly-shaped" particles refer to three dimensional shapes wherein at least two different cross sections taken therethrough have different shapes. Preferred shapes include irregular random shaped ground particles. Such irregularly-shaped particles do not act like "ball bearings" but instead provide a greater resistance to flow likely due to increased frictional resistance. It should be noted that the particle size of spheroidal particles is the diameter of such particles, and the particle size of irregularly-shaped particles is the distance of its longest dimension across the particle.

According to the embodiment in which the adhesive composition is used to mount tiles (especially large format tiles) to substrates (especially wall surfaces), the weight ratios of the various fillers vary over particular ratios. The weight ratio of treated fillers to untreated fillers preferably varies over a range of from about 0.3:1 to about 0.7:1, more preferably from about 0.4:1 to about 0.6:1, and most preferably from about 0.45:1 to about 0.55:1. The weight ratio of spheroidal fillers to irregularly-shaped fillers preferably varies over a range of from about 2:1 to about 6:1, more preferably from about 3:1 to about 5:1, and most preferably from about 3.4:1 to about 4:1. The weight ratio of fillers having a larger particle size (i.e., most preferably between about 2 μm and about 5 μm) to fillers having a smaller particle size (i.e., most preferably between about 0.4 μm and about 1 μm) preferably varies over a range of from about 2:1 to about 6:1, more preferably from about 3:1 to about 5:1, and most preferably from about 3.4:1 to about 4:1.

Without being bound by any theory, it is believed that the combination of at least two fillers contributes to the rheological and other properties of the present invention. When all of the fillers used are treated, the adhesive can readily become too viscous and difficult to be worked. On the other hand, when only spheroidal fillers are used, the sag resistance of the composition suffers. The use of at least some stearate-treated, irregularly-shaped filler appears to improve the green grab of the adhesive.

As mentioned above, the moisture-curable adhesive composition of the present invention also comprises a rheology modifier. A rheology modifier provides or enhances either pseudoplastic or thixotropic properties to a composition. The rheology modifier is used in this application to provide the rheological properties for the adhesive application. A wide range of rheology modifiers may be used in the present invention, including aforementioned filler fumed silica and other polyamide waxes.

The amount of the rheology modifier may vary over a wide range to achieve the properties of the particular adhesive application for which the composition is being used. In the embodiment in which the adhesive composition used to mount tiles (especially large format tiles) to substrates (especially wall surfaces), the rheology modifier is preferably present in an amount of about 0.5 to about 10% by weight. More preferably, the rheology modifier is present in an amount of about 1 to about 8% by weight. Most preferably, the rheology modifier is present in an amount of about 2 to about 5% by weight.

The moisture-curable adhesive composition of the present invention may also comprise a number of additional additives. One such additional optional additive is a diluent used to dilute the composition, typically to reduce its viscosity and improve its workability for whatever application the adhesive is being used for. The diluent may be evaporative, such as a solvent, or non-evaporative, such as a plasticizer. In either case, it is preferable to use a diluent which does not contain much inherent moisture so that premature curing of the adhesive does not take place. Typical solvents may include odorless mineral spirits or other hydrophobic solvents. If used, the amount of the solvent may vary over a wide range to achieve the properties of the particular adhesive application for which the composition is being used.

According to the embodiment in which the adhesive composition is used to mount tiles (especially large format tiles) to substrates (especially wall surfaces), the diluent of the moisture-curable adhesive composition of the present invention comprises a plasticizer. The addition of a plasticizer allows the adjustment of the viscosity, flexibility, and sag properties of the curable composition and the mechanical properties (e.g., hardness, tensile strength and elongation) of the cured product. Specific examples of the plasticizer include phthalic acid ester compounds such as dibutyl phthalate, diisononyl phthalate (DINP), diheptyl phthalate, di(2-ethylhexyl) phthalate, diisodecyl phthalate (DIDP), and butyl benzyl phthalate; terephthalic acid ester compounds such as bis(2-ethylhexyl)-1,4-benzenedicarboxylate; non-phthalic acid ester compounds such as diisononyl 1,2-cyclohexanedicarboxylate; aliphatic polyvalent carboxylic acid ester compounds such as dioctyl adipate, dioctyl sebacate, dibutyl sebacate, diisodecyl succinate, and tributyl acetylcitrate; unsaturated fatty acid ester compounds such as butyl oleate and methyl acetylricinoleate; alkylsulfonic acid phenyl esters (specifically, product name: Mesamoll (LANXESS)); phosphoric acid ester compounds such as tricresyl phosphate and tributyl phosphate; trimellitic acid ester compounds; chlorinated paraffins; hydrocarbon oils such as alkylbiphenyls and partially hydrogenated terphenyls; plasticizing oils, such as mineral oil; and epoxy plasticizers such as epoxidized soybean oil and benzyl epoxystearate.

Also, polymer plasticizers may be used. Specific examples of the polymer plasticizers include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers prepared from dibasic acids (e.g., sebacic acid, adipic acid, azelaic acid, phthalic acid) and divalent alcohols (e.g., ethylene glycol, diethylene glycol, triethylene glycol, propylene glycol, dipropylene glycol); polyethers such as polyether polyols (e.g., polyethylene glycol, polypropylene glycol, polytetramethylene glycol) which have a number average molecular weight of 500 or higher, or even a number average molecular weight of 1,000 or higher, and derivatives obtained by converting the hydroxy groups of these polyether polyols into ester groups, ether groups or other groups; polystyrenes such as polystyrene and poly-α-methylstyrene; polybutadiene, polybutene, polyisobutylene, polybutadiene-acrylonitrile, and polychloroprene.

The amount of the plasticizer may vary over a wide range to achieve the properties of the particular adhesive application for which the composition is being used. In the embodiment in which the adhesive composition used to mount tiles (especially large format tiles) to substrates (especially wall surfaces), the plasticizer (if used) is preferably present in an amount of about 2 to about 40% by weight. More preferably, the plasticizer is present in an amount of about 10 to about 30% by weight. Most preferably, the plasticizer is present in an amount of about 18 to about 24% by weight. In such embodiment, the plasticizer is preferably an alkylsulphonic acid ester with phenol and is phthalate-free. Such a product is sold under the trademark MESAMOLL by Lanxess of Cologne Germany.

Another such additional optional additive is a plurality of irregularly-shaped crumb rubber particles having an average particle size of between about 0.1 mm to about 10 mm, preferably from about 0.3 mm to about 5 mm, more preferably from about 0.5 to about 1.5 mm, and most preferably about 1 mm. The amount of the irregularly-shaped crumb rubber particles may vary over a wide range to achieve the properties of the particular adhesive application for which the composition is being used. In the embodiment in which the adhesive composition used to mount tiles (especially large format tiles) to substrates (especially wall surfaces), the plurality of irregularly-shaped crumb rubber particles is present in an amount of about 0.5 to about 10%, preferably from about 1 to about 5% by weight, and most preferably from about 1.5 to about 4% by weight.

The plurality of irregularly-shaped crumb rubber particles aid in ensuring that excessive "squeeze out" of the adhesive between the adherends does not occur upon application of the adherends to each other when the adhesive is in an uncured state. In addition, where undulations in the mating surfaces cause the gap between those surfaces to become narrow, the irregularly-shaped crumb rubber particles serve to prevent the surfaces from touching and therefore allow for at least some adhesive to be maintained across substantially the entire mating surfaces. Materials that are useful as spacer particles include any that are crush-resistant and do not break or deform more than 25% from their original shape under the intended installation pressures. These could include various types of rubber, such as EPDM (ethylene propylene diene monomer) or SBR (styrene-butadiene rubber). The ability of a material to meet this requirement may be dependent on the size and shape chosen.

The irregularly-shaped crumb rubber particles may be of any non-spherical geometric shape. Examples include conical-, polygonal-(cubes, pentagons, hexagons, octagons, and the like), and polyhedral-shaped particles, as well as irregular shaped particles, as well as non-uniform particles having, for example circular, elliptical, oval, square, rectangular, triangular or polygonal cross sections found at least partially therein. "Irregularly-shaped" particles may refer to three dimensional shapes wherein at least two different cross sections taken therethrough have different shapes. Preferred shapes include irregular random shaped ground particles.

Further optional additives include a dehydrating agent, an adhesion promoter, and a catalyst. Examples of suitable dehydrating agents include but are not limited to vinyl trimethoxysilane, any vinyl alkoxysilane, inorganic and organic zeolites, and the like. Preferably, the dehydrating agent is vinyl trimethoxysilane sold under the tradename Silquest A-171 by Momentive Performance Materials of Waterford N.Y. The amount of the dehydrating agent may vary over a wide range to achieve the properties of the particular adhesive application for which the composition is being used. In the embodiment in which the adhesive composition used to mount tiles (especially large format tiles) to substrates (especially wall surfaces), the adhesive comprises from about 0.1 to about 10% by weight of a dehydrating agent, more preferably from about 0.5 to about 6% by weight; and most preferably from about 1 to about 4% by weight of a dehydrating agent.

As mentioned above, the moisture curable adhesive composition may also include an adhesion promoter. Examples of adhesion promoters include but are not limited to N-(beta-aminoethyl)-gamma-aminopropyltrimethoxysilane, N-(beta-aminoethyl)-gamma-aminopropyldimethoxymethylsilane, gamma-glycidoxypropltrimethoxylsilane, any substituted silane where one or more of the substitutions contains a different functional group and the like. Preferably, the adhesion promoter is N-(beta-Aminoethyl)-gamma-aminopropyltrimethoxysilane sold under the tradename Silquest A-1120 Momentive Performance Materials of Waterford N.Y. The amount of the adhesion promoter may vary over a wide range to achieve the properties of the particular adhesive application for which the composition is being used. In the embodiment in which the adhesive composition used to mount tiles (especially large format tiles) to substrates (especially wall surfaces), the moisture curable adhesive composition comprises from about 0.1 to about 10% by weight of an adhesion promoter, more preferably from about 0.3 to about 6% by weight; and most preferably from about 0.5 to about 3% by weight of an adhesion promoter.

The moisture curable adhesive preferably may also include a catalyst. Conventional catalysts may be used including such catalysts as tertiary amine catalysts, tin catalysts, lead catalysts, bismuth catalysts and the like. Tertiary amine catalysts include by way of example and not limitation include compounds having one tertiary nitrogen atom including triethylamine, N,N-dimethylcyclohexylamine, N-methylomorpholine, N-ethylmorpholine, N-(2-hydroxyethyl)morpholine, N,N-dimethyl-p-toluidine, β-(dimethylamino)propionitrile, N-methylpyrrolidone, N,N-dicyclohexylmethylamine, and the like; compounds having two tertiary nitrogen atoms including N,N, N',N'-tetramethylethylenediamine, N,N,N', N'-tetramethylpropane-1,3-diamine, N,N,N',N'-tetramethylhexane-1,6-diamine, bis(N,N-dimethylaminoethyl)ether, bis(2-dimethylaminoethyl) ether, ethylene glycol bis(3-dimethyl)aminopropyl ether, N'-cyclohexyl-N,N-dimethylformamidine, N,N'-dimethylpiperazine, trimethylpiperazine, 1,2,-peperidinoethane, bis(aminopropyl)piperazine, N-methyl-N'-(2-hydroxyethyl) piperazine, N-methyl-N'-(2-hydroxyethyl)piperazine, N—(N',N'-dimethylaminoethyl)morpholine, bis(morpholinoethyl)ether, bis(2,6-dimethylmorpholinoethyl)ether, 1,2-dimethylimidazole, N-methylimidazole, 1,4-diazine, diazabicyclo[2.2.2]-octane, 1,4-diazabicyclo[3.3.0] oct-4-ene, 1,5-diazabicyclo[4.3.0]non-5-ene, 1,8-diazabicyclo-[5.4.0]-undec-7-ene, phenolates thereof, octoates thereof, and the like; compounds having three tertiary nitrogen atoms including N,N,N',N",N"-pentamethyldiethylenetriamine, N,N,N', N",N"-pentamethyldipropylenetriamine, tetramethylguanidine, N-cyclohexyl-N',N',N",N"-tetramethylguanidine, N-methyl-N'-(2-dimethylamino)ethylpiperazine, 1,5,7-triazabicyclo [4.4.0]dec-5-ene, and the like; and compounds having four nitrogen atoms including 1,1,4,7,10,10-hexamethyltriethylenetetramine, 1,3,5-tris(N,N-dimethylpropyl) hexadro-1,3,5-triazine, and the like.

Tin catalysts include by way of example but not limitation stannous octoate, dibutyltin diacetate, dibutyltin dilaurate, dibutyltin mercaptide, dibutyltin thiocaboxylate, dibutyltin dimaleate, dioctyltin mercaptide, dioctyltin thiocarboxylate, dibutyl tin oxide in diisooctyl phthalate, aliphatic organotin and the like.

Lead, bismuth, and mercury catalysts include by way of example but not limitation lead 2-ethylhexanate, bismuth neodecanoate, phenylmercury propionate and the like. The preferred catalyst of the present invention is a butyltin ketonate catalyst, such as the catalyst sold under the trademark REAXIS® C226 by Reaxis Inc. of McDonald, Pa. The amount of the catalyst may vary over a wide range to achieve the properties of the particular adhesive application for which the composition is being used. In the embodiment in which the adhesive composition used to mount tiles (especially large format tiles) to substrates (especially wall surfaces), the moisture curable adhesive composition comprises from about 0.01 to about 2% by weight of catalyst, more preferably from about 0.05 to about 1% by weight; and most preferably from about 0.1 to about 0.5% by weight of a catalyst.

Suitable additional optional additives include by way of example, but not limitation, anti-oxidants, lubricants, extenders, biocides, UV absorbers, and stabilizers. Some additives can operate to control the polymerization process, thereby affecting the physical properties (e.g., modulus, glass transition temperature) of the product formed from the composition. Others can affect the integrity of the product of the composition (e.g., protect against de-polymerization, oxidative degradation, or biological attack). The amounts of these additional additives can vary over a wide range to achieve the properties of the particular adhesive application for which the composition is being used.

Preferably, the moisture curable adhesive has one or more of the following attributes. These include but are not limited to good repositionability over time, being a one component system, rapid development of tack but sufficient open time to be able to be applied to a large format tile, good bond strength upon curing, good impact resistance upon curing, good sound abatement upon curing, minimal shrinkage upon curing, and ease of cleanability after curing preferably with only plastic tools. Preferably, the moisture-curable adhesive composition has rheological properties such that it has a low viscosity at high shear rates and a high viscosity at low shear rates. In particular, the viscosity of the adhesive at the shear stress of gravity when the adhesive is used to mount a tile to a wall surface is sufficiently high to maintain the tile with no or substantially no sag. In a preferred embodiment, the viscosity under gravity is sufficient to maintain a large format tile in position with no or substantially no sag. Even more preferably, the viscosity under gravity is sufficient to maintain a tile having an area density of between about 0.5 to about 2.9 lbs/ft$^2$ in position with no or substantially no sag. In addition, the adhesive composition preferably has a low viscosity at a shear rate typically achieved upon mixing the adhesive prior to application. Stated another way, the viscosity is sufficiently low such that an operator can easily mix and work the composition without much resistance. Preferably, the composition of the present invention has a thixotropic index (measured as explained below in the examples) of between about 5 and 10, more preferably between 6 and 9, and most preferably between 7 and 8. Furthermore, in some embodiments, it has been found desirable that the adhesive has a density of between about 1.2 and about 2 g/ml, preferably between about 1.4 and 1.8 g/ml, and most preferably between about 1.5 and 1.6 g/ml.

The above components of the moisture curable adhesive composition can be mixed using conventional processing equipment and technology. The order of addition of the constituents is not especially critical, except for the dehydrating agent, which should be added after mechanical moisture reduction is done. Preferably, steps are taken during the processing of the moisture curable adhesive composition to minimize the pickup of moisture by the composition, and in some instances to reduce the moisture of the composition. Generally, this involves heating the mixture and/or pulling a vacuum to remove the water, but any other method known to those skilled in the art could be used to bring the moisture content to, or maintain it at, an acceptable level. Preferably, the mechanical steps are taken to reduce the moisture content of the adhesive composition to a moisture content of less than about 900 ppm, more preferably less than about 850 ppm, and most preferably less than about 800 ppm as measured by ASTM Test Method D 4672. Then, a dehydrating agent is added which further reduces the moisture content.

In an embodiment of the present invention, a moisture curable adhesive of the invention is used to join at least two adherends (or at least two materials or pieces of material to be adhered). The adherends include but are not limited to paper, metal, ceramic (including ceramic tile), glass, textiles, cloth, plastic, rubber, foams, masonry, wood, plywood, drywall, concrete, leather, composites (including fiberglass), cement sheets, and the like. Further, the two or more adherends can be of the same or different materials. The moisture curable adhesive is applied to at least one adherend of the two adherends. The adhesive can be applied to a single side, or both or multiple sides of the adherends similar to conventional adhesives. The adhesive can be applied by conventional methods such as using a person's hands, spatulas, rollers, trowels or sprayers, and dispensed in conventional packaging such as tubes, cans or containers.

Once the adhesive develops a tack, the two adherends are first contacted forming a bond between the at least two adherends with the adhesive. Preferably, the tack is sufficient to temporarily prevent the at least two adherends from pulling apart prior to the curing of the adhesive. Preferably, the adherends can be repositioned for some period of time prior to initial cure. The initial cure is defined as the point at which one adherend cannot be moved relative to the other without degrading the bond. At this point, the adherends can no longer be repositioned without permanently degrading the bond strength. In the case of a bond where one substrate is immovable, i.e. a wall, it is the point at which bracing is no longer necessary to hold the substrates together. Preferably, the at least two adherends can be repositioned with respect to each other for up to and more preferably more than about 5 minutes after they are first contacted, more preferably for up to or more than about 10 minutes, even more preferably for up to or even more than about 15 minutes. Also preferably, the bond between the at least two adherends is cured sufficiently to prevent further degradation of such bond after a reasonable period of time.

In an embodiment of the invention, a method for mounting a large format tile to a wall comprises the steps of: (1) applying an adhesive composition to a back surface of a large format tile, wherein the tile has a surface area of at least one square meter and the adhesive composition is moisture-curable and comprises: (i) a polymer component selected from a silane-terminated polyalkylene oxide and/or a polyurethane; (ii) a plurality of amino-silane modified wollastonite fibers; (iii) a filler; and (iv) a rheology modifier; and; and (2) applying the large format tile to a substantially vertically-extending wall surface by contacting the back surface of the tile with the wall surface prior to full curing of the adhesive composition. Although described herein primarily with respect to mounting a large format tile to a wall, the method described herein, including in the preceding sentence, can be used to adhere any two adherends. Preferably, the large format tile has an area density of between about 0.5 to about 2.9 lbs/ft$^2$, more preferably between about 1 and about 2.3 lbs/ft$^2$, and most preferably between about 1.3 and about 2 lbs/ft$^2$. Embodiments of the invention improve sag resistance of such tiles and substantially or entirely eliminate sag. According to embodiments of the invention, the method further comprises the step of, after the step of applying the large format tile to a substantially vertically-extending wall surface, repositioning the large format tile by moving the tile in a direction parallel to the wall surface.

In the method for mounting a large format tile to a wall of the present invention, preferably the thickness of the adhesive layer is about one-sixteenth to one-quarter of an inch, preferably about one-eighth of an inch. In embodiments of the invention, at least 70%, more preferably at least 80%, and most preferably at least 90% of the back surface of the tile is covered with adhesive prior to mounting it to a wall surface. Most preferably, substantially all of the back surface is covered. In some embodiments of the invention, a mechanical fastener is used during curing to ensure that no sagging occurs. A mechanical fastener, such as pin or rail, supports the load of the tile while the adhesive cures. In preferred embodiments, no mechanical fastener is used (so that the adhesive even before it is cured is sufficient to prevent sag), but only a lippage control device is used during curing. A lippage control device ensures alignment in the z-direction (i.e., into and out of the wall). Thus, with a lippage control device, no or only a minimal "seam" can be detected between tiles. However, the lippage control device does not prevent sag of the tile, so embodiments of the invention used with only a lippage control device have sufficient sag resistance to avoid any sag by their own properties (and not with the assistance of any mechanical fastener). The adhesive can be used to adhere a wide range of materials together. The material of the tile to be adhered is usually the fiberglass backing (but the adhesive could work directly on the ceramic tile) and the material of the wall surface may be wood, drywall, plywood, but is typically concrete.

Embodiments of the present invention provide a number of benefits that address certain shortcomings of prior art products and methods. With regards to the mixing, embodiments of the invention are a one-part adhesive that reacts with atmospheric moisture and moisture that is on the surface of the substrates to produce a final cured material. Such a one-part adhesive does not require another component to be mixed and is therefore easier to use, eliminating the need to have separate components on a job site. This leads to an easier-to-use product as well as a cleaner work area. Embodiments of the invention also do not require both the tile and substrate to be applied with adhesive. This removes the "back butter" step and reduces the necessary open time of the product, although embodiments of the invention have a fairly long open time of about 30 minutes. Thereafter, a skin forms on the adhesive due to the reaction of the adhesive with atmospheric moisture. Thus, the open time is the time after application of an adhesive to a surface during which the adhesive will still function to adhere the surface to another substrate (i.e., before the formation of a skin which would prevent such adherence). The tile can be placed on a table to be coated and then placed on the wall, without having to also coat the wall. In addition, embodiments of the invention minimize the formation of "legs" or strings of material that come off the trowel after application. This also leads to a cleaner work area.

Furthermore, embodiments of the invention also can be cleaned from the grout lines with plastic tools, even after curing. This greatly reduces the chance of a damaged tile, especially with respect to tiles which are larger in surface area and thinner, such as gauged porcelain tiles. Embodiments of the present invention can accommodate a larger deviation in the final substrate profile. In particular, once the adhesive makes contact with the substrate, it does not rebound off the wall to as great of an extent as prior art solutions due to the rheological properties of the adhesive. This characteristic eliminates or greatly reduces the likelihood of voids between the tile and the substrate. Furthermore, embodiments of the present invention provide a small amount of workability with regard to the repositioning (i.e., by permitting movement of the tile in a direction parallel to the wall surface of the tile once it is set, namely in any direction in an x-y plane assuming that the z-axis is transverse to the substrate or wall surface). Thus, the tile can be moved slightly with the requisite amount force if an error was made when the tile was initially set. Finally, embodiments of the invention provide little or no sagging of the tile, even when used to mount large format tiles on substantially vertically extending wall surfaces and even for tiles having a high area density, such as at 2.9 lbs/ft$^2$ or above.

Moreover, embodiments of the invention show outstanding impact resistance and sound abatement (i.e., reduction in sound transmitted across an assembly and received on the opposite side).

Aspects of the Invention

Aspect 1. A moisture-curable adhesive composition comprising:
   a) a polymer component selected from a silane-terminated polyalkylene oxide and/or a polyurethane;
   b) a plurality of amino-silane modified wollastonite fibers having an average aspect ratio of from about 1.5:1 to about 12:1 and an average fiber length of from about 6 μm to about 825 μm;
   c) at least two fillers, wherein one of said fillers is untreated and a second of said fillers is treated with a modifier selected from the group consisting of a fatty acid derivative, a silane, a titanate, and mixtures thereof and wherein one of said fillers has an average particle size of between about 1.5 μm and about 10 μm and a second of said fillers has an average particle size of between about 0.1 μm and about 1.3 μm, wherein at least one of said fillers is irregularly shaped;
   d) a rheology modifier.

Aspect 2. The composition of aspect 1, wherein the polymer component is the silane-terminated polyalkylene oxide and is present in an amount of about 5 to about 40% by weight.

Aspect 3. The composition of aspects 1 or 2, wherein:
the silane-terminated polyalkylene oxide is present in an amount of about 10 to about 30% by weight;
the plurality of amino-silane modified wollastonite fibers is present in an amount of about 3 to about 15% by weight, and the amino-silane loading is about 1 to about 35% by weight of the fibers;
the at least two fillers are present in an amount of about 30 to about 70% by weight; and
the composition further comprises a plasticizer in an amount of about 2 to about 40% by weight.

Aspect 4. The composition of aspect 3, wherein:
the silane-terminated polyalkylene oxide is present in an amount of about 12 to about 24% by weight;
the plurality of amino-silane modified wollastonite fibers is present in an amount of about 5 to about 10% by weight, and the amino-silane loading is about 2 to about 20% by weight of the fibers;
the at least two fillers are present in an amount of about 40 to about 60% by weight; and
the plasticizer is present in an amount of about 10 to about 30% by weight.

Aspect 5. The composition of aspect 4, wherein:
the silane-terminated polyalkylene oxide is present in an amount of about 15 to about 20% by weight;
the plurality of amino-silane modified wollastonite fibers is present in an amount of about 6 to about 8% by weight (most preferably about 7% by weight), and the amino-silane loading is about 4 to about 10% by weight of the fibers;
the at least two fillers are present in an amount of about 42 to about 50% by weight; and
the plasticizer is present in an amount of about 18 to about 24% by weight.

Aspect 6. The composition of any of aspects 1 through 5 further comprising a plurality of irregularly-shaped crumb rubber particles having an average particle size of between about 0.5 to 1.5 mm.

Aspect 7. The composition of aspect 6, wherein the plurality of irregularly-shaped crumb rubber particles is present in an amount of about 0.5 to about 10%, preferably from about 1 to about 5% by weight, and most preferably from about 1.5 to about 4% by weight.

Aspect 8. The composition of any of aspects 1 through 7 further comprising a dehydrating agent, an adhesion promoter, and a catalyst.

Aspect 9. The composition of any of aspects 1 through 8, wherein the silane-terminated polyalkylene oxide comprises:
a first silane-terminated polyalkylene oxide comprising a methoxysilyl chain polymer and having a branched polyether backbone and a molecular weight in the range of about 16,000 to about 18,000 g/mol; and
a second silane-terminated polyalkylene oxide comprising a methoxysilyl chain polymer and having a linear polyether backbone and a molecular weight in the range of about 26,000 to about 28,000 g/mol.

Aspect 10. The composition of aspect 9, wherein:
the first silane-terminated polyalkylene oxide is present in an amount of between about 5 to about 30% by weight; and
the second silane-terminated polyalkylene oxide is present in an amount of between about 0.5 to about 5% by weight.

Aspect 11. The composition of any of aspects 1-10, wherein the at least two fillers comprise:
a first filler comprising stearate-treated ground calcium carbonate particles and having a mean particle size between about 1.5 µm and about 10 µm, wherein said first filler is present in the composition in an amount of about 1 to about 27% by weight, preferably between about 7 to about 19% by weight, and most preferably about 13% by weight;
a second filler comprising untreated ground calcium carbonate particles and having a mean particle size between about 1.5 µm and about 10 µm, wherein said second filler is present in the composition in an amount of about 1 to about 34% by weight, preferably between about 14 to about 28% by weight, and most preferably about 23% by weight; and
a third filler comprising stearate-treated ground calcium carbonate particles and having a mean particle size between about 0.1 µm and about 1.3 µm, wherein said third filler is present in the composition in an amount of about 1 to about 20% by weight, preferably between about 5 to about 15% by weight, and most preferably about 10% by weight.

Aspect 12. The composition of any of aspects 1 through 11, wherein the average aspect ratio of the plurality of the amino-silane modified wollastonite fibers is from about 2:1 to about 8:1 and the average fiber length of the amino-silane modified wollastonite fibers is from about 10 µm to about 40 µm.

Aspect 13. The composition of aspect 12, wherein the average aspect ratio of the plurality of the amino-silane modified wollastonite fibers is from about 2:1 to about 5:1 and the average fiber length of the amino-silane modified wollastonite fibers is from about 12 µm to about 25 µm, preferably from about 2.6:1 to about 3:1 and from about 17 µm to about 20 µm, respectively.

Aspect 14. The composition of any of aspects 1-13, wherein the untreated filler has an average particle size of about 3 µm and the treated filler has an average particle size of about 0.7 µm.

Aspect 15. The composition of any of aspects 1-14, wherein the modifier is the fatty acid derivative.

Aspect 16. The composition of any of aspects 1-15, wherein the fatty acid derivative comprises stearic acid.

Aspect 17. The composition of any of aspects 1-16, wherein the polymer component is the polyurethane and the polyurethane comprises a silane-modified polyurethane.

Aspects 18. A method for mounting a large format tile to a wall comprising the steps of:
a. applying an adhesive composition to a back surface of a large format tile, wherein the tile has a surface area of at least 1 square meter and the adhesive composition is moisture-curable and comprises: (i) a polymer component selected from a silane-terminated polyalkylene oxide and/or a polyurethane; (ii) a plurality of amino-silane modified wollastonite fibers; (iii) a filler; and (iv) a rheology modifier; and
b. applying the large format tile to a substantially vertically-extending wall surface by contacting the back surface of the tile with the wall surface prior to full curing of the adhesive composition.

Aspect 19. The method of aspect 18, wherein the large format tile has dimensions of at least 1×1 meters, preferably at least 1×3 meters, and most preferably at least 1.5×4.5 meters.

Aspect 20. The method of aspects 18 or 19, wherein the large format tile has an area density of between about 0.5 to about 2.9 lbs/ft$^2$, preferably between about 1 and about 2.3 lbs/ft$^2$, and most preferably between about 1.3 and about 2 lbs/ft$^2$.

Aspect 21. The method of any of aspects 18-20 further comprising the step of, after step b, repositioning the large format tile by moving the tile in a direction parallel to the wall surface.

Aspect 22. A method for adhering two adherends comprising the steps of:
 a. applying an adhesive composition to a back surface of a first adherend, wherein the adhesive composition is moisture-curable and comprises: (i) a polymer component selected from a silane-terminated polyalkylene oxide and/or a polyurethane; (ii) a plurality of aminosilane modified wollastonite fibers; (iii) a filler; and (iv) a rheology modifier; and
 b. applying the first adherend to a second adherend by contacting the back surface of the first adherend with the second adherend prior to full curing of the adhesive composition.

Aspect 23. The method of aspect 22 using the composition of any of aspects 1-17.

EXAMPLES

The experiments done to test an embodiment of the invention were largely done by testing physical properties of the resultant formula. The final product was tested for its rheological properties by viscometer, rheometer, sag resistance for vertical application, and ease of troweling. The properties were also tested by applying large format tiles of varying size as well as thickness and confirming the practical use as well as functional use of the invention.

A formulation having the constituents of Table 1 below was made by making lab scale batches (<0.75 gallon) on a lab scale mixer. The percentages are given in percent by weight, including any inherent moisture in each constituent. The polymer component, plasticizer, and fillers were charged into the kettle and allowed to mix. After a homogenous paste was achieved, the material was subjected to heat (170° F.) and vacuum. These conditions were continued until the moisture was found to be less than 800 ppm by Karl Fischer titration. Once the paste was mechanically dehydrated, the chemical dehydrating agent (a vinyl trimethoxysilane, VTMO/A171) was added. The formula was then finished by adding the adhesion promoter and catalyst. The finished formula was packaged into cartridges for testing. The first generation required more time under heat and vacuum as it contained more filler which is the source of the water contamination. It also appears the wollastonite does not require as much time to disperse in the polymer as other untreated fillers.

TABLE 1

| Constituent | Description | Weight Percent |
|---|---|---|
| SAX260 (SMP Polymer) | Standard SMP polymer used in all formulations. polyether backbone and methoxysilyl chain polymer that is branched. Molecular weight range of 16,000-18,000 g/mol | 15.65% |
| S227 (SMP Polymer) | polyether backbone and methoxysilyl chain polymer that is linear. Molecular weight range of 26,000-28,000 | 2.13% |
| MESAMOLL (Plasticizer) | Non Phthalate plasticizer. Used to help keep polymer flexible | 20.51% |
| CRAYVALLAC SLX (Rheology modifier) | A polyamide wax designed to help improve thixotropy in SMP based formulas | 3.61% |
| ATOMITE (ground Calcium Carbonate filler) | Ground CaCO3. used to extend formula | 22.97% |
| Nyad Wollastocoat MG 20804 (Amino Silicate Treated Wollastonite) | Surface treated wollastonite amino silane. Using a Microtrac particle analyzer, the median particle size reported is 28 μm | 6.56% |
| KOTAMITE (Ground Calcium Carbonate filler) | Stearate treated Ground CaCO3. used to help improve rheology to resist sag | 13.13% |
| CAMEL-CAL ST (ground Calcium Carbonate filler) | Irregular shaped CaCO3 with a small particle size. Used to help give the formula initial grab | 9.85% |
| Crumb Rubber 0.5-1.5 mm (recycled crumb rubber spacers) | Ground pieces of Irregularly shaped EPDM rubber with an average of 1 mm particle size | 2.63% |
| A-171 (chemical dehydrating agent) | Vinyl trimethoxy silane. Used to chemically treat any residual moisture in formula | 1.87% |
| A-1120 (Adhesion promoter) | Adhesion promoter | 0.92% |
| REAXIS C226 (catalyst) | Catalyst | 0.17% |

The average particle size of the Nyad Wollastocoat MG 20804, as reported by the manufacturer, is indicated in the table above. This value was obtained using a Microtrac particle size analyzer. In order to characterize the fibers using SEM, the following process was carried out on two samples of the Nyad Wollastocoat MG 20804 fibers, referred to herein as "the SEM Process."

The SEM Process
 1) The particles were well-mixed and divided into two batches, referred to herein as numbers 89644 and 89645. About 1-2 mg of each powder was placed on standard glass slides from Dow Corning using a spatula.
 2) Optical images with an ME600 optical microscope from Nikon were captured. The images were captured in transmission mode at 100× magnification using a CF plan objective from Nikon with a numerical aperture of 0.3. Crossed polarizers were used to eliminate or reduce the influence of dirt particles on results. Wollastonite is a crystal and dirt particles are usually not. In crossed polarizer illumination, isotropic (dirt) particles will appear black and blend into the background, so are eliminated.
 3) Twenty optical images were captured for each sample using a Pixelink PLD 725 color camera at full resolution.
 4) Fourteen to eighteen of these images were used to generate image analysis results. The reason some of the images were not analyzed is that on the discarded images, the concentration of the powders was too high to separate the particles for image analysis.

Figure 4A:
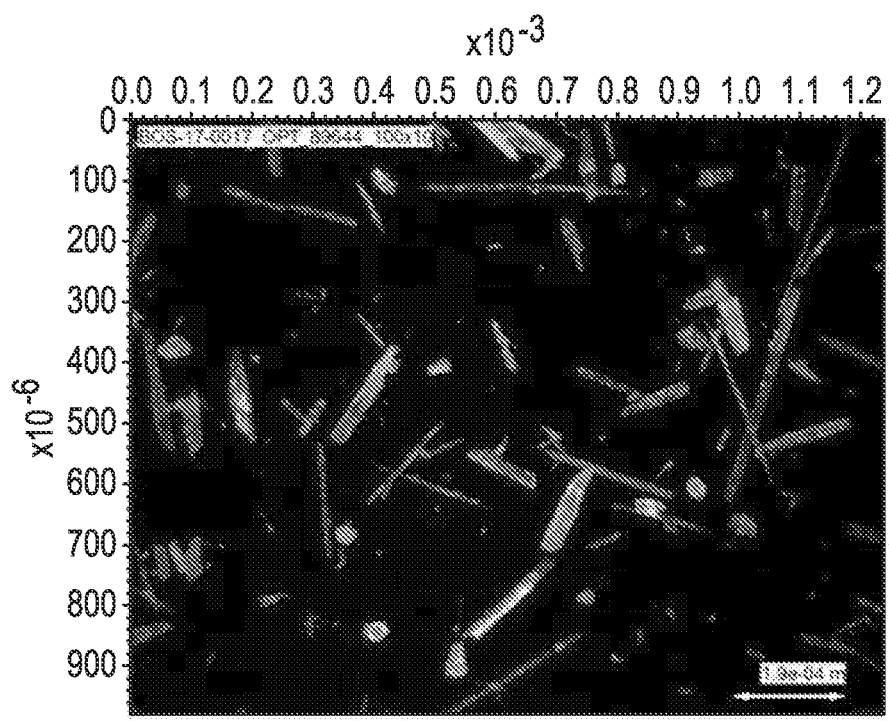
FIG. 4a is an SEM image of a wollastonite sample (number 89644) used in the present invention captured using a Pixelink PLD 725 color camera at full resolution.
Figure 4B:
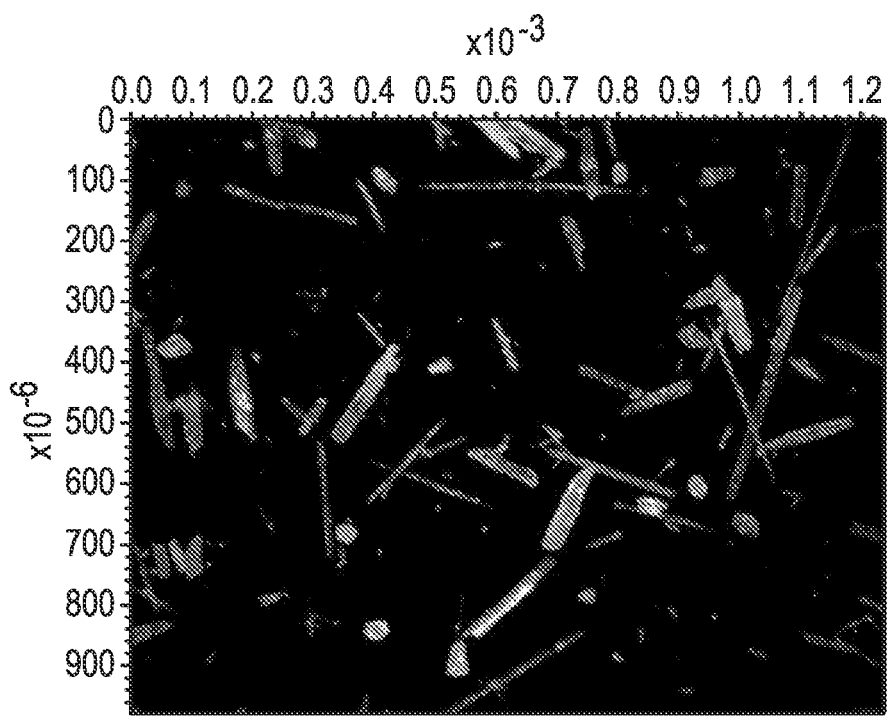
FIG. 4b is the image shown in FIG. 4a after gray scaling.
Figure 4C:
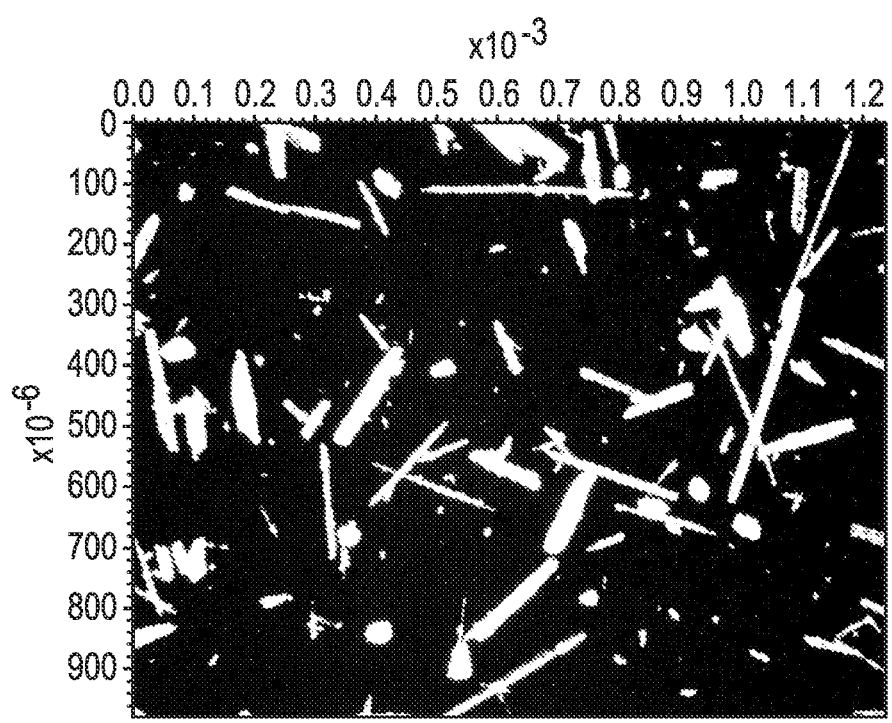
FIG. 4c is the image shown in FIG. 4b after the image contrast was enhanced by narrowing the displayed dynamic range.
Figure 4D:
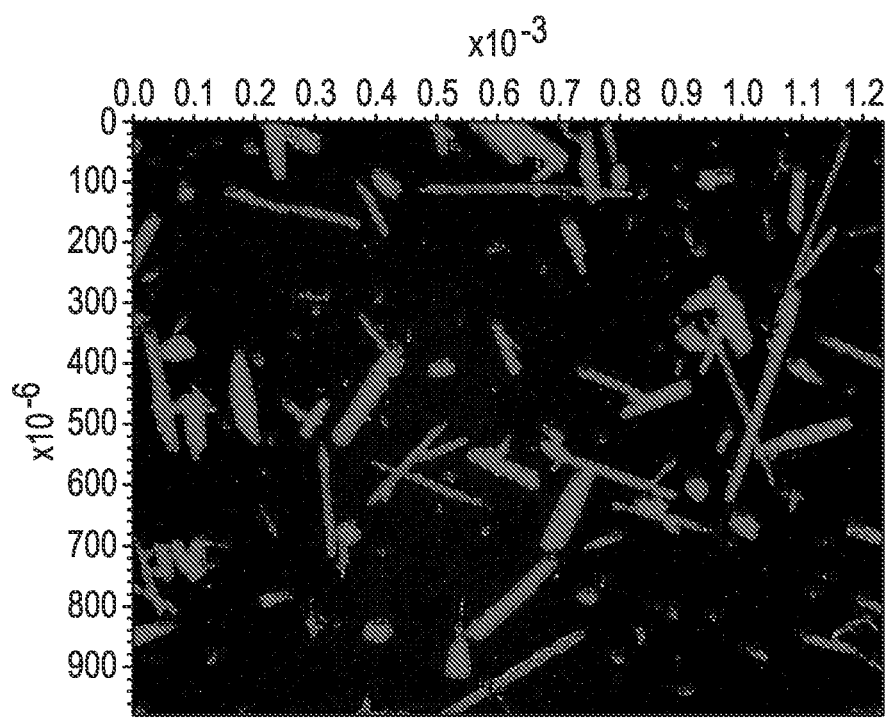
FIG. 4d is the image shown in FIG. 4c after the image was binarized and overlayed with the original.
Figure 4E:
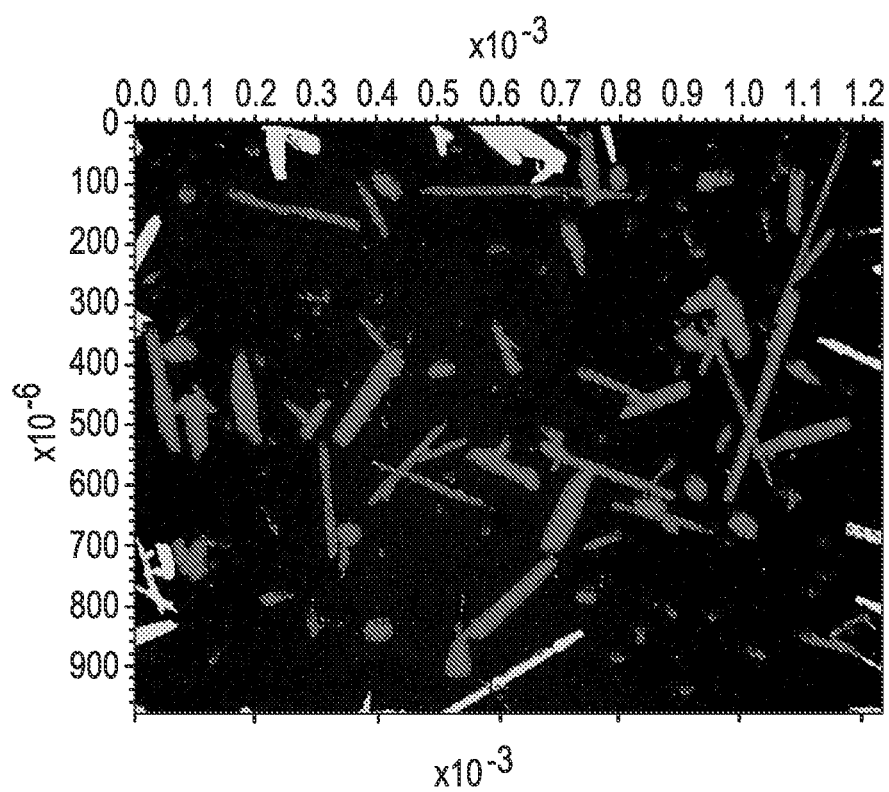
FIG. 4e is the image shown in FIG. 4d after a border removal technique was applied to eliminate all particles touching the image boundaries so that the values would not be distorted.
Figure 4F:
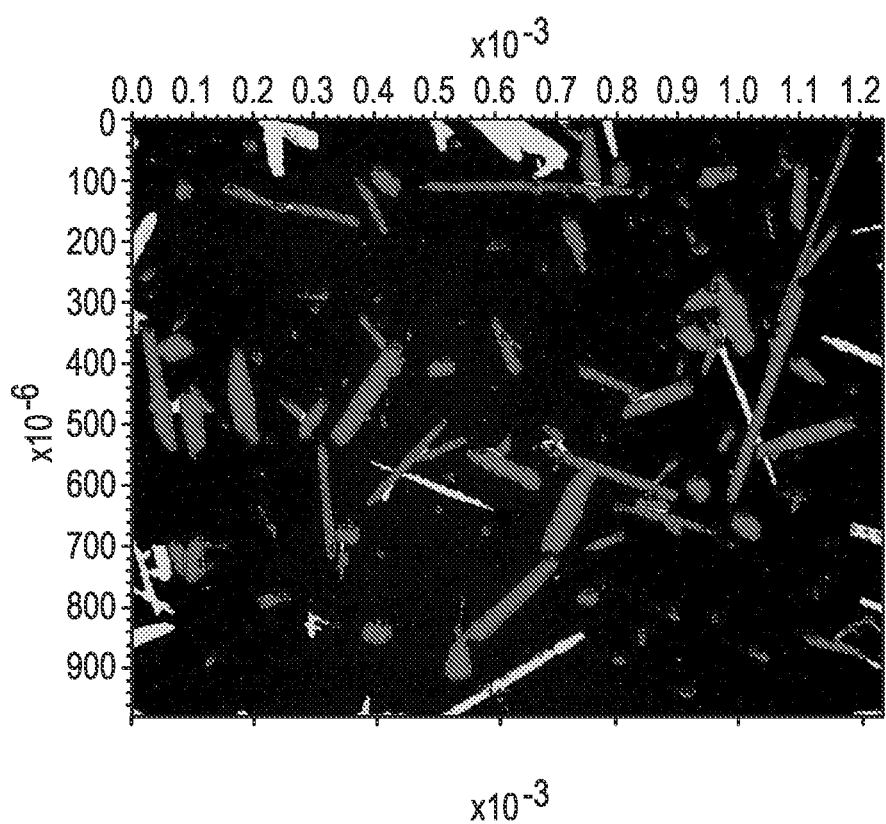
FIG. 4f is the image shown in FIG. 4e after overlapping particles were separated or eliminated manually by drawing lines in between touching particles or eliminating particles clustered together.

5) The images, one of which is shown as FIG. 4a, were uploaded into Igor Pro 7 image analysis software (available from Wavemetrics, Inc. of Oregon), scaled, and transformed into gray scale images, shown as FIG. 4b. The transformation into gray scale used the standard factors of 0.299, 0.587, and 0.114 for red, green, and blue, respectively. Thus, for each color pixel, the obtained values for red, green, and blue were multiplied by their respective values, truncated to the nearest integer, and then these three truncated products were summed to obtain the gray scale value for that pixel.
6) Image contrast was enhanced by narrowing the displayed dynamic range, with the enhanced image shown as FIG. 4c.
7) The image was binarized using a standard, publicly available histogram thresholding technique incorporated in the Igor Pro 7 software.
8) The binarized images were overlayed with the original one, shown in FIG. 4d. Overlay of the binarized image (in red) and particle counter (in blue) with the original image. In a black-and-white image of the above, these red fibers are shown as gray, lighter than the black background. The blue numbers do not appear, but, for clarity, the software assigns a number to each distinct fiber.
9) A border removal technique was applied to eliminate all particles touching the image boundaries so that the values would not be distorted, and that image is shown in FIG. 4e. The area of these particles would not be calculated accurately, if they would be included, because it is not known how far beyond the borders those particles extended. In FIG. 4e, those fibers that are "killed" (or eliminated) shown in white in the image.
10) Overlapping particles were then separated or eliminated manually, by drawing lines in between touching particles, or eliminating particles clustered together. The resulting image is shown in FIG. 4f, with those fibers that are or eliminated shown in white in the image.
11) The software counted the particles and calculated their lengths, their aspect ratios, diameters, circularity, and eccentricity. The "length" of each fiber is defined to be the length of the major axis of a best fit ellipse within each fiber. The aspect ratio is the length divided by the width, which is the length of the minor axis of such ellipse. The "diameter" of a non-circular particle is defined as that of a circle, covering the same area as the actual particle. Circularity is defined as the square of the circumference of the particle divided by 4*pi*(area of particle). For a perfect sphere, the circularity approaches 1. The eccentricity was calculated from a fit of the particle to an ellipse and calculating sqrt $(1-a^2/b^2)$, with a and b being the major and minor axis lengths of the fitted ellipse, with the minor axis being the diameter of a circle formed by rotating the fiber along the axis of its length.

The values obtained for the samples were an average fiber length of 18.5 microns, an average aspect ratio (length divided by width for each fiber) of 2.8:1, an average diameter of about 21.5 microns, an average circularity of 3.1, and an average eccentricity of 0.83, with over 5,500 particles analyzed. All of these results of the SEM Process are provided as mean averages.

Testing of Materials

Testing of materials was separated into two groups of characterization. The first was done on the liquid material with the focus being application properties. The second set of tests was done on the fully cured material (in accordance with ASTM D 412, Die C, with a rate of 2"/min) with the goal to test the longer term performance of the material after installation. The liquid characterization was predominately done by using a Brookfield viscometer (testing at approximately 5 different RPM speeds) ASTM Method D 2556, a Boeing sag tester ASTM D 2202-00, vertically adhering a concrete block (no test method just and internal test and a subjective trowel test. The Brookfield viscosity testing was done at ambient temperature and this was done to quickly compare the thixotropic index of the materials using ASTM Method D 2556. All viscosity measurements were taken shortly after opening a sealed container of an adhesive of the present invention. The Boeing sag tester was used to assess whether the materials propensity to sag when a thick amount of material is applied. This test is graded by the distance a material slides down a graduated surface as referenced in ASTM D 2202-00. The vertically installed concrete block test was done to assess whether the material could support the block without sagging. The result of this test was pass/fail. The final test involved the user applying the material with a ½"×15/32" trowel to a 1'×1' area and test for difficulty of troweling. This test was also a pass/fail test.

The second group of testing was largely focused on testing of the final cured properties of the formula. This was done through testing of tensile and elongation by following ASTM D 412 and by Lap Shear testing following ASTM D1002-10.

TABLE 2

| | |
|---|---|
| Pigment Volume Concentration | 0.38 |
| Density (g/ml) | 1.55 |
| Tested | |
| Trowel | Pass |
| Slump | 0.1 |
| Viscosity RPM Spindle | 6 |
| 0.5 | 4.45E+06 cPs |
| 1 | 2.38E+06 cPs |
| 2.5 | 1.07E+06 cPs |
| 5 | 5.78E+05 cPs |
| 10 | 3.30E+05 cPs |
| Concrete block vertical test | Pass |
| Thixotropic Index | 7.43 |
| LapShear | 55 psi |
| Tensile | 132 psi |
| Elongation | 101% |

The material was applied to the large format tile, having a fiberglass mesh backing, by trowel. Suction cups on a tile sized frame were placed on the opposite side of the fiberglass meshing to pick up and turn the tile onto saw horses. The fiberglass meshing was placed facing up as this was the side to receive the adhesive. An excess of adhesive material was placed on the tile and slowly troweled from the edges of the tile to the center. The ridges of the trowel were run parallel the shortest side of the tile. This helped move the material to ensure full coverage (or substantial full coverage) of the tile as well as the least likely to contaminant the front of the tile. This was done until the full tile was covered. Once covered, the suction cups were used to place the tile on the wall. The tile was initially set with a few taps on the tile to contact it with the wall. The tile was then repositioned into place and then set into place by using a tile setting tool similar to a float. This is done to force out air as well as ensure the highest degree of coverage possible. This was done over the entire face of the tile. The frame was then removed. Viscosity of the samples did not change significantly for at least 30 minutes after opening A Thixotropic index (TI) describes a ratio comparing the adhesive composition's viscosity at a lower shear rate with its viscosity at a higher shear rate. We compared viscosity values from 1 RPM to 10 RPM, using a Brookfield viscometer according to ASTM D 2556 and using spindle 6. This was done to show how a material handles increasing amounts of shear stress applied to it. With a higher ratio, the material is considered "pseudo-plastic." The graph in FIG. 1 shows viscosity vs. rpm for an adhesive formulation of the present invention as shown in Table 1. The adhesive formulation of the present invention has a TI of 7.43:1 (i.e., 2,460,000/331,000). The shear rate provided by gravity is analogous to a value of less than 0.5 rpm, and the viscosity value there in excess of 4,610,000 cP is sufficient for purposes of the present invention.

Other factors, in addition to TI, are important to the properties of the adhesive composition of the present invention. First, the absolute viscosity values at low shear rate are important. The viscosity of the formulation of the present invention at shear rates of less than 0.5 rpm would exceed 4,610,000 cPs. A certain value allows the formulation to hold a block according to the test described above. The current formulation was found to hold the block. This shows that the formula of the present invention had a viscosity that overcame the shear stress caused by the force of gravity exerted on the mass of the tile. Second, we discovered that the extent of decrease up until a shear rate analogous to being worked by trowel was important. The viscosity of the present invention decreases significantly after an rpm of >10 rpm, meaning that the viscosity decreases fairly quickly with increasing rpm, meaning that it is easier to work by trowel relative to other compositions which do not decrease as quickly.

TABLE 3

| RPM: | 0.5 | 1.0 | 2.5 | 5.0 | 10.0 | Thixotropic index |
|---|---|---|---|---|---|---|
| Viscosity of Formulation of Table 1 | 4610000 cPs | 2460000 cPs | 1080000 cPs | 590000 cPs | 331000 cPs | 7.43 |

A test in accordance with ASTM E 90-09/NVLAP 08/P06 was conducted by Riverbank Acoustical Laboratories in order to assess the noise abatement of the exemplary formulation of the present invention in accordance with Table 1. The dimensions of the wall were 96" wide, 108" high, and 5.125" thick. The area of the tested surface wall was 72 ft², with the filler being 54.0 ft² and the comp being 126 ft². The weight of the assembly was 725.5 lbs and the area weight was 10.08 lbs/ft². The volume of the source room was 6,297.6 ft³ and the area of the source room was 2,066 ft². The volume of the receive room was 6,254.5 ft³ and the area of the receive room was 2,042 ft². Six tests were run: Control runs of drywall only with and without acoustic insulation (which was batt insulation), gauged porcelain panel commercially available as Laminam from Crossville, Inc. of Tennessee with a conventional mortar sold under the trademark REFLEX thin set by Bostik, Inc. of Wisconsin (also with and without the same acoustic insulation), and gauged porcelain panel commercially available as Laminam with the formulation of the invention shown in Table 1 (also with and without the same acoustic insulation).

The values were obtained using ASTM E413-16 and reflect improved noise abatement with increased values, on a logarithmic scale. As can be seen, the control wall had values of 40 and 50, without and with acoustic insulation, respectively. As can be shown below, with the exemplary formulation of the present invention of Table 1 above (referred to below as "Bosti Set") showed a better noise abatement than drywall with acoustic installation (values of 58 versus 50). The noise abatement of the present invention is an even greater improvement of noise abatement (58 versus 45) when comparing noise abatement with Gauged Porcelain Panel with the conventional mortar. In addition, the use of the formulation of the present invention without acoustic insulation had a better noise abatement value than the control with acoustic insulation (52 versus 50).

TABLE 4

| | Without acoustic insulation | With Acoustic insulation |
|---|---|---|
| Drywall only | 40 | 50 |
| Laminam With Mortar | 43 | 45 |
| Laminam with Bosti Set | 52 | 58 |

A further test was conducted similar to the above but varying the wall stud gauge and spacing, as shown below in Table 5.

TABLE 5

| | Substrate Type* | | | |
|---|---|---|---|---|
| | Hollow Wall | | Wall w/Acoustic Insulation | |
| | Wall Stud Gauge & Spacing | | | |
| | 25 Ga, 24" O.L. | 20 Ga, 16" O.L. | 25 Ga, 24" O.L. | 20 Ga, 16" O.L. |
| Bosti-Set ™ - Bonding 3.5 mm Porcelain Tile Panel to Wall Assembly | 52 | 47 | 58 | 51 |
| Thin Set Mortar Bonding 3.5 mm Porcelain Tile Panel to Wall Assembly | 42 | 40 | 45 | 44 |
| Wall Only | 45 | 35 | 50 | 40 |

*⅝" Type "X" Drywall on both sides of 3⅝" steel studs for all configurations

As before, the values were obtained using ASTM E413-16 and reflect improved noise abatement with increased values, on a logarithmic scale. As can be seen, the control wall had an average value of 40 and the control mortar had an average value of 41, without acoustic insulation respectively. On the other hand, the exemplary formulation of the present invention (referred to below as "Bosti-Set") showed a markedly better noise abatement providing an average value of 49.5. With acoustic insulation, the control wall had an average value of 45 and the control mortar had an average value of 44.5. On the other hand, the exemplary formulation of the present invention showed a markedly better noise abatement providing an average value of 54.5.

Where a range of values is provided, it is understood that each intervening value, and any combination or sub-combination of intervening values, between the upper and lower limit of that range and any other stated or intervening value in that stated range, is encompassed within the range of values recited. In addition, the invention includes a range of a constituent which is the lower limit of a first range and an upper limit of a second range of that constituent. When a single constituent is mentioned, it is understood that more than one of that constituent may be used unless indicated otherwise.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue or prior invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A moisture-curable adhesive composition comprising:
   a) a polymer component selected from a silane-terminated polyalkylene oxide and/or a polyurethane;
   b) a plurality of amino-silane modified wollastonite fibers having an average aspect ratio of from about 1.5:1 to about 12:1 and an average fiber length of from about 6 µm to about 825 µm;
   c) a first filler comprising stearate-treated ground calcium carbonate particles and having a mean particle size between about 1.5 µm and about 10 µm, wherein said first filler is present in the composition in an amount of about 1 to about 27% by weight; a second filler comprising untreated ground calcium carbonate particles and having a mean particle size between about 1.5 µm and about 10 µm, wherein said second filler is present in the composition in an amount of about 1 to about 34% by weight; and a third filler comprising stearate-treated ground calcium carbonate particles and having a mean particle size between about 0.1 µm and about 1.3 µm, wherein said third filler is present in the composition in an amount of about 1 to about 20% by weight; wherein at least one of said fillers is irregularly shaped;
   d) a rheology modifier.

2. The composition of claim 1, wherein the polymer component is the silane-terminated polyalkylene oxide and is present in an amount of about 5 to about 40% by weight.

3. The composition of claim 2, wherein:
   the silane-terminated polyalkylene oxide is present in an amount of about 10 to about 30% by weight;
   the plurality of amino-silane modified wollastonite fibers is present in an amount of about 3 to about 15% by weight, and the amino-silane loading is about 1 to about 35% by weight of the fibers;
   the first filler, the second filler, and the third filler are present in total amount of about 30 to about 70% by weight; and
   the composition further comprises a plasticizer in an amount of about 2 to about 40% by weight.

4. The composition of claim 3, wherein:
   the silane-terminated polyalkylene oxide is present in an amount of about 12 to about 24% by weight;
   the plurality of amino-silane modified wollastonite fibers is present in an amount of about 5 to about 10% by weight, and the amino-silane loading is about 2 to about 20% by weight of the fibers;
   the first filler, the second filler, and the third filler are present in total amount of about 40 to about 60% by weight; and
   the plasticizer is present in an amount of about 10 to about 30% by weight.

5. The composition of claim 4, wherein:
   the silane-terminated polyalkylene oxide is present in an amount of about 15 to about 20% by weight;
   the plurality of amino-silane modified wollastonite fibers is present in an amount of about 6 to about 8% by weight, and the amino-silane loading is about 4 to about 10% by weight of the fibers;
   the first filler, the second filler, and the third filler are present in total amount of about 42 to about 50% by weight; and
   the plasticizer is present in an amount of about 18 to about 24% by weight.

6. The composition of claim 1 further comprising a plurality of irregularly-shaped crumb rubber particles having an average particle size of between about 0.5 to 1.5 mm.

7. The composition of claim 6, wherein the plurality of irregularly-shaped crumb rubber particles is present in an amount of about 0.5 to about 10%.

8. The composition of claim 1 further comprising a dehydrating agent, an adhesion promoter, and a catalyst.

9. The composition of claim 1, wherein the silane-terminated polyalkylene oxide comprises:
   a first silane-terminated polyalkylene oxide comprising a methoxysilyl chain polymer and having a branched polyether backbone; and
   a second silane-terminated polyalkylene oxide comprising a methoxysilyl chain polymer and having a linear polyether backbone.

10. The composition of claim 9, wherein:
    the first silane-terminated polyalkylene oxide is present in an amount of between about 5 to about 30% by weight; and
    the second silane-terminated polyalkylene oxide is present in an amount of between about 0.5 to about 5% by weight.

11. The composition of claim 1, wherein:
    the first filler is present in the composition in an amount of between about 7 to about 19% by weight;

the second filler is present in the composition in an amount of between about 14 to about 28% by weight; and the third filler is present in the composition in an amount of between about 5 to about 15% by weight.

12. The composition of claim 1, wherein the average aspect ratio of the plurality of the amino-silane modified wollastonite fibers is from about 2:1 to about 8:1 and the average fiber length of the amino-silane modified wollastonite fibers is from about 10 to about 40 µm.

13. The composition of claim 12, wherein the average aspect ratio of the plurality of the amino-silane modified wollastonite fibers is from about 2:1 to about 5:1 and the average fiber length of the amino-silane modified wollastonite fibers is from about 12 µm to about 25 µm.

14. The composition of claim 1, wherein the untreated filler has an average particle size of about 3 µm and the third filler has an average particle size of about 0.7 µm.

15. The composition of claim 1, wherein the rheology modifier is the fatty acid derivative.

16. The composition of claim 1, wherein the fatty acid derivative comprises stearic acid.

17. The composition of claim 1, wherein the polymer component is the polyurethane and the polyurethane comprises a silane-modified polyurethane.

* * * * *